United States Patent [19]

Lyon

[11] Patent Number: 4,601,622
[45] Date of Patent: Jul. 22, 1986

[54] FASTENER

[75] Inventor: Lyman R. Lyon, Bloomfield Hills, Mich.

[73] Assignee: Microdot Inc., Darien, Conn.

[21] Appl. No.: 262,695

[22] Filed: May 11, 1981

[51] Int. Cl.$^4$ .............................................. F16B 39/30
[52] U.S. Cl. .................................................. 411/311
[58] Field of Search ........................................ 411/311

[56] References Cited

U.S. PATENT DOCUMENTS 4,266,590  5/1981  McKewan ........................... 411/307

FOREIGN PATENT DOCUMENTS 957858  4/1964  United Kingdom ................ 411/411

Primary Examiner—Andrew V. Kundrat
Attorney, Agent, or Firm—Lyman R. Lyon

[57] ABSTRACT

A bolt is provided with a male thread, an end portion of which is of modified configuration, for acceptance in an element having a female thread of standard configuration. The modified portion of the male thread has a wedge ramp at the root thereof and a decreased pitch relative to the standard pitch of the thread on the female element which, in combination, results in optimum distribution of stress in the bolt as well as a prevailing torque relationship between the bolt and female element.

3 Claims, 1 Drawing Figure

U.S. Patent  Jul. 22, 1986  4,601,622
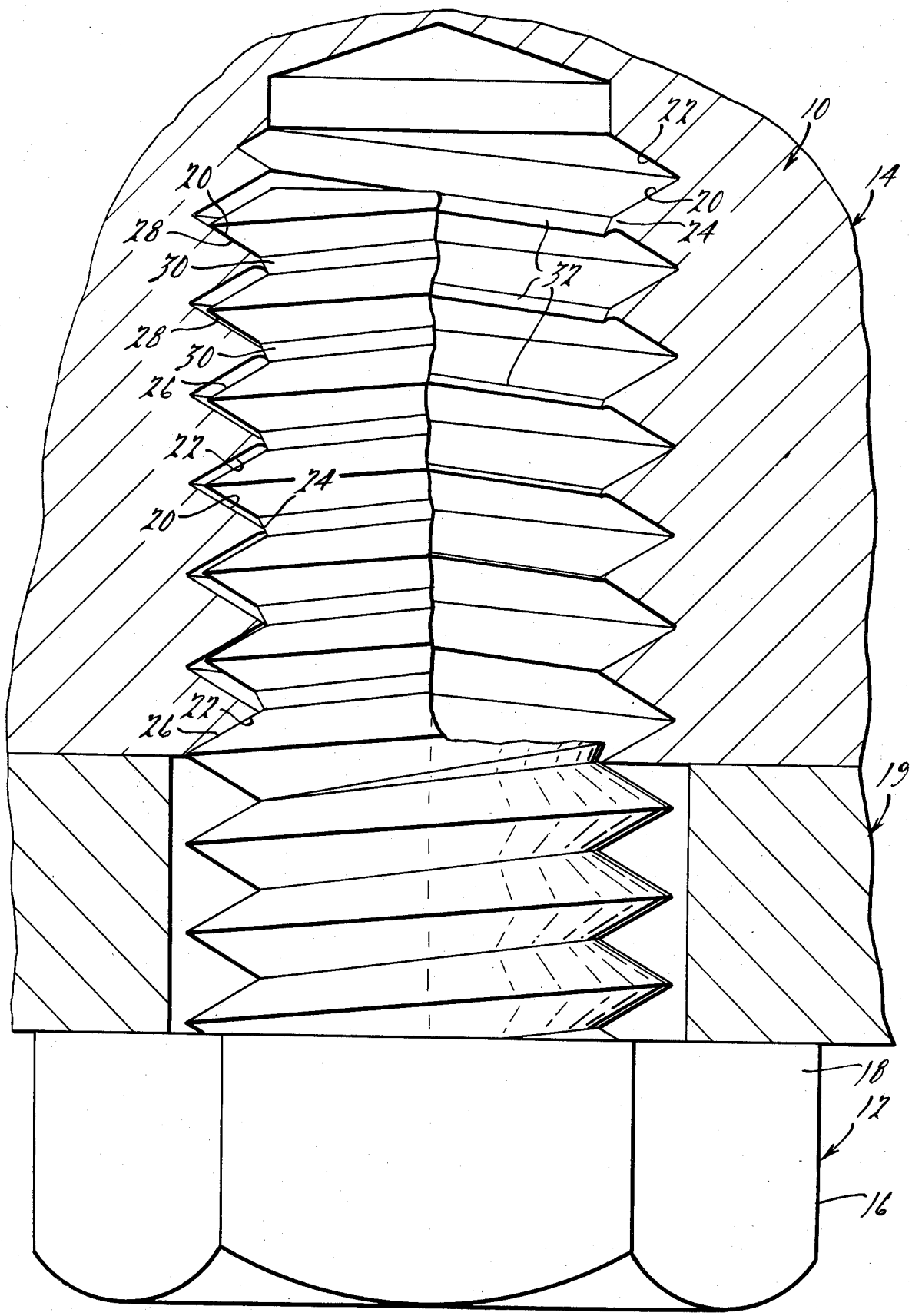

FASTENER

BACKGROUND OF THE INVENTION

The invention relates to a bolt having an external thread portion with a wedge ramp at the root thereof, of the type disclosed in U.S. Pat. No. 4,076,064, in combination with decreased pitch relative to the pitch of a standard thread in a complementary nut or threaded aperture.

BRIEF SUMMARY OF THE INVENTION

A bolt is provided with a male thread, an end portion of which is of modified configuration, for acceptance in an element having a female thread of standard configuration. The modified portion of the male thread has a wedge ramp at the root thereof and a decreased pitch relative to the standard pitch of the thread on the female element which, in combination, results in optimum distribution of stress in the bolt as well as prevailing torque relationship between the bolt and female element.

DESCRIPTION OF THE DRAWING

The drawing is a sectional side elevation of a fastener assembly wherein a bolt utilizing the invention is partially broken away for clarity.

DETAILED DESCRIPTION OF THE INVENTION

A fastener assembly 10 as shown in the drawing comprises an improved bolt 12 and a threaded element 14. The threaded element 14 has a standard, uniform thread form and pitch as found in, for example, a commercially available nut or in a blind hole in a casting having a thread cut by a standard tap. In the disclosed embodiment of the invention, the bolt 12 has a head 16 with a hexagonal wrenching surface 18 to facilitate advancement of the bolt 12 against a workpiece 19. When the fastener assembly 10 is tightened by application of torque to the bolt 12, the bolt 12 will move upwardly relative to the element 14, as seen in the drawing, to exert a clamping force on the workpiece 19.

A preferred form of the element 14 is shown in which a helical, uniform pitch, V-thread has straight top and bottom flanks 20 and 22, respectively, which meet at a crest 24 at the minor diameter of the thread and have a 60° included angle.

In accordance with the instant invention, the bolt 12 has a helical, V-thread with straight top and bottom flanks 26 and 28, respectively. A modified portion of the bolt thread, of predetermined axial length, has a straight wedge ramp 30 that extends between the flanks 26 and 28 at the minor diameter or root thereof at substantially a 30° angle to the central axis of the bolt 12.

The pitch of the modified portion of the male thread of the bolt 12 is less than that of the female thread on the element 14, the latter preferably being a standard and uniform pitch and thread size used in the fastener industry. The unmodified convolutions of the bolt thread adjacent the head correspond to these standard nut threads. The reduction in pitch of the modified portion of the bolt thread is preferably uniform for a selected number of convolutions, each of which is preferably provided with the wedge ramp 30. It is to be noted that the bolt 12 is initially free running in the female element 14 due to axial clearance in the thread forms.

When the bolt 12 is advanced a predetermined distance into the element 14, interaction of the bottom (or leading) flank 22 on the female thread at the bottom of element 14 with the top (or leading) flank 26 of the bolt 12 effects relative movement of the crest 24 of the thread on element 14 upwardly within the thread form of the bolt 12, as seen in the drawing, resulting in engagement of the ramp 30 at the upper end of the bolt 12 with the crest 24 of the female thread at the uppermost portion of the element 14. On continuing application of torque and load, the crest 24 on the female thread of element 14 rides up the ramp 30 on the bolt 12 and is coined or deformed to effect an interference fit between the ramp 30 on the uppermost threads of the bolt 12 and element 14 which maximizes loading of the upper end of the bolt 12 as well as to exhibit a prevailing torque locking effect.

The number of "depitched" thread convolutions on the bolt 12 must be carefully controlled so that when the bottom flank 22 of the first female thread convolution on the element 14 contacts a top flank 26 of the male thread on the bolt 12, as shown in the drawing, maximum deformation of the crest 24 on the female thread of the element 14 occurs at which time the bottom (or trailing) flank 28 of the uppermost thread convolution of the bolt 12 at the top of the bolt 12 contacts the top (or trailing) flank 20 of the adjacent female thread thereby to maximize loading of the upper end of the bolt 12 yet avoid jamming of the threads.

As indicated, the female thread of element 14 is preferably standard and, therefore, has a predetermined, uniform pitch. The axial length of the ramp 30 on the bolt 12 can be preselected as determined by the class of fit of the assembly. The dimensional relationship of the thread pitch of the bolt 12 and thread pitch of the element 14 can be determined from the formula.

Where:

$RL = N(P_m - P_b)$ $P_n$ = the pitch of the standard female thread on the element 14

$P_b$ = the pitch of the depitched thread portion on the bolt 12

$RL$ = the axial length of ramp 30

$N$ = the number of depitched bolt thread convolutions.

It is to be noted that only a predetermined end portion of the bolt 12 is "depitched" and provided with the ramp 30 to preclude thread jamming of the bolt 12 in the element 14. The "depicted" portion of the bolt 12 is placed at the upper end thereof, as seen in the drawing, so as to maximize stress in the bolt 12 in such a way as to provide an optimum stress distribution condition within the bolt 12. When the bolt 12 having a "depitched" portion is to be used with a standard nut, the location of the "depitched" and "ramped" portion should be coordinated with the grip range of the bolt 12 and height of the nut.

The term "standard" as used herein is intended to refer to accepted thread specifications for form of thread, pitches, and tolerances as set forth in handbooks, etc., such as American Standard threads, and those set by industry, government, military or corporate publications on thread standards.

It should be appreciated that while a preferred embodiment of the invention has been disclosed, it is susceptible to modification, variation and change without departing from the proper scope or fair meaning of the subjoined claims.

What is claimed is:

1. A fastener assembly comprising an internally threaded element having a standard thread of substantially uniform pitch and including top and bottom flanks intersecting to define a thread crest, and an externally threaded element having a depitched thread portion at one end sized so as to be receivable in said internally threaded element, the depitched thread portion of said externally threaded element having top and bottom flanks with a wedge ramp at the root thereof diverging with respect to its central axis in a direction toward the one end thereof, the pitch of said depitched thread portion being less than the pitch of the thread in said internally threaded element whereby the crest thereof exhibits an interference fit with the wedge ramp on the depitched thread portion of said externally threaded element which is maximized at said one end thereof.

2. A fastener assembly as set forth in claim 1 wherein the pitch of the thread on said externally threaded element is substantially equal to the pitch of the thread on said internally threaded element minus the dividend of the axial length of the wedge ramp between said external thread flanks divided by the number of convolutions of said external thread portion.

3. An externally threaded element adapted to be received in an element having internal threads of standard pitch, said externally threaded element comprising a first thread portion of standard pitch and a second thread portion, said second thread portion having a wedge ramp at the roof thereof diverging with respect to the central axis of said bolt in a direction away from the first thread portion, the pitch of the external thread of said second thread portion being less than the pitch of the thread of said first thread portion whereby the crest of the internal thread in said externally threaded element exhibits an interference fit with the wedge ramp on said second thread portion of said element which is maximized at the end of said externally threaded element opposite said first portion.

* * * * *